United States Patent [19]

Schott et al.

[11] 4,379,447

[45] Apr. 12, 1983

[54] HEAT SAVER FOR HOUSEHOLD HEATERS

[76] Inventors: Lawrence A. Schott, 15940 Warwick Rd., Detroit, Mich. 48223; Roger A. Schott, 15060 Seminole, Redford, Mich. 48239

[21] Appl. No.: 239,063

[22] Filed: Feb. 27, 1981

[51] Int. Cl.³ .......................... F24H 3/12; F24B 7/00
[52] U.S. Cl. .............................. 126/117; 165/DIG. 2; 237/55
[58] Field of Search ................ 126/117; 165/DIG. 2; 237/55

[56] References Cited

U.S. PATENT DOCUMENTS

| 3,251,406 | 5/1966 | Lauer | 126/117 |
| 3,934,798 | 1/1976 | Goldsmith | 165/DIG. 2 |
| 4,044,820 | 8/1977 | Nobles | 237/55 |
| 4,122,999 | 10/1978 | Belcastro | 126/117 |
| 4,138,062 | 2/1979 | Graden | 126/117 |
| 4,194,558 | 3/1980 | Goosman | 126/117 |

Primary Examiner—Daniel J. O'Connor
Attorney, Agent, or Firm—Barnes, Kisselle, Raisch, Choate, Whittemore & Hulbert

[57] ABSTRACT

A heat saving and recovery system which includes a rectangular housing insert for a furnace flue gas duct incorporating a coil carrying a heat transfer fluid such was water. The coil communicates with a cold return conduit or other heat transfer device in a forced flow system to transfer heat from the chimney conduit to the return fluid intended to be heated by the furnace.

2 Claims, 3 Drawing Figures

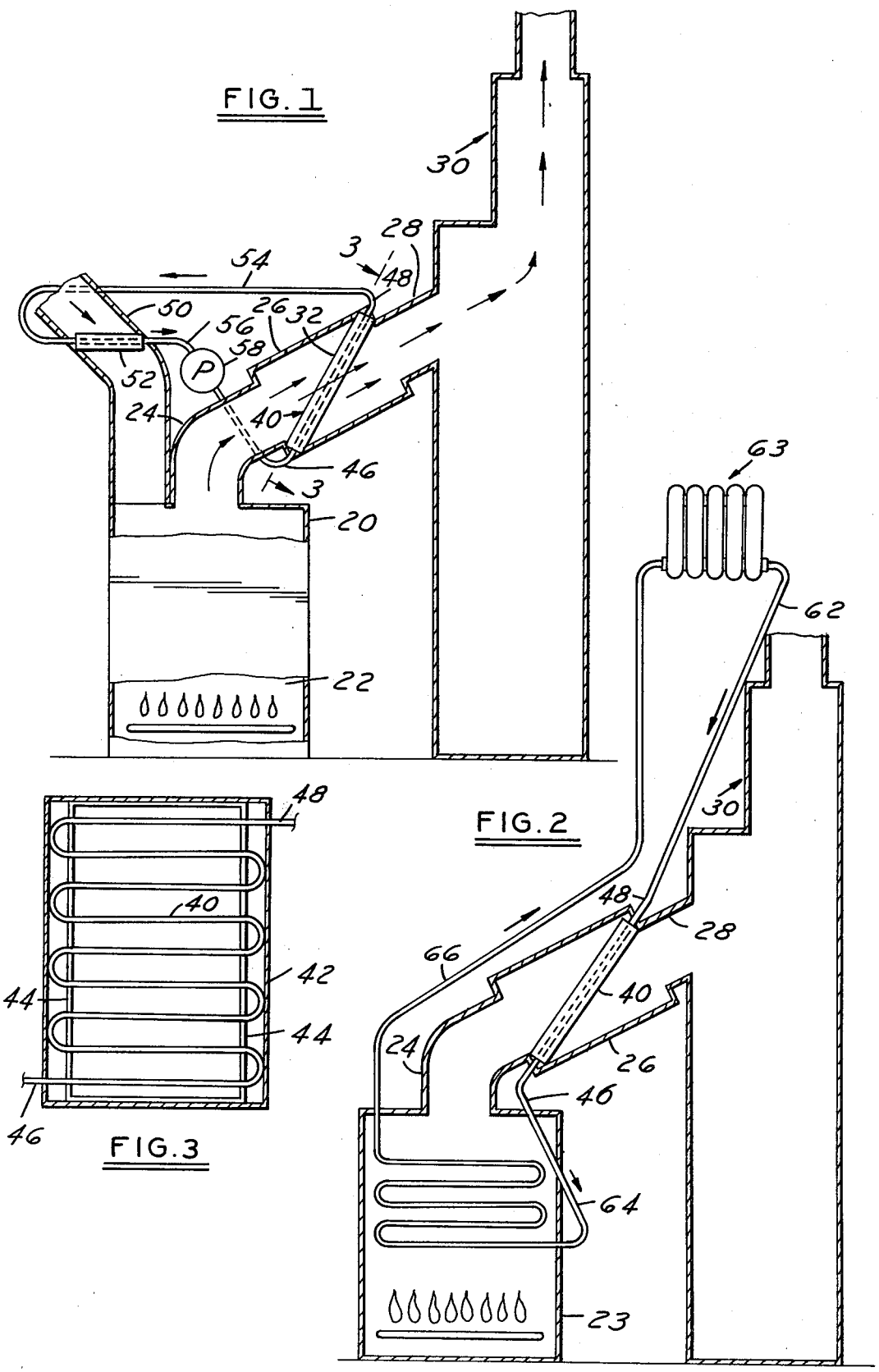

HEAT SAVER FOR HOUSEHOLD HEATERS

FIELD OF SEARCH

Heat transfer devices to salvage heat from chimney flue gases.

BACKGROUND OF INVENTION

The fuel shortages, which have developed in recent years and the dependence on fuel from foreign sources, have necessitated the search for ways and means to save fuel. The present invention is directed to a novel and simple device to recover heat from chimney flue gases. It involves the use of a pair of coils, one in a chimney flue and one in a cold air flue to carry heat, otherwise lost out the chimney, to the air being heated by the furnace.

BRIEF DESCRIPTION OF THE DRAWINGS

Drawings accompany the disclosure and the various views thereof may be briefly described as:

FIG. 1, a sectional view of a furnace utilizing the invention.

FIG. 2, a modified embodiment for use with a hot water system.

FIG. 3, a view of heat exchange coil on line 3—3 of FIG. 1.

DETAILED DESCRIPTION OF THE INVENTION

In FIG. 1, a standard furnace is shown at 20. This may be a coal furnace, an oil furnace, or a gas furnace. It has a combustion chamber 22 and a flue gas outlet 24 into which has been introduced a rectangular box 26 having an inlet connected to the flue gas outlet 24 and an outlet connected to a flue pipe 28 leading to a standard chimney 30.

Diagonally disposed in the box 26 is a serpentine coil 40 mounted in a frame 42 and having spacer plates 44 as sides of a second internal frame. The coil 40 has an inlet conduit 46 and an outlet conduit 48.

The furnace has a cold air duct 50 to feed cold air to the heating bonnet from the space being heated. In this duct is a similar coil 52 having an inlet conduit 54 connected to outlet conduit 48 and an outlet conduit 56 connected to inlet conduit 46. A pump 58 in the connecting conduit 56 moves a water supply through the coils 40 and 52. This pump, driven by a motor, is operated when the fan of the hot air system is working. Thus, heat absorbed by coil 40 in the chimney flue will be transferred to coil 52 where the cold air entering the furnace bonnet will be pre-heated.

Thus, the heat loss through the chimney can be significantly reduced.

In FIG. 2, a modified system is shown where the coil 40 in a hot water furnace 23 is connected by pipe 62 to a room radiator 63 in a room which is being heated by the furnace 23. If the furnace is used with a hot water system, the coil 40 can be in series in the cold water return line using only a single coil. Thus, the water is preheated before reaching the boiler. If the coil 40 is connected directly into the cold water return line, no extra pump is needed since the basic circulating pump in the system will function.

The pipe 62 is a cold return line from the room radiator 63 and connects to the coil 40 in chamber 26. A pipe 64 connects the coil 40 to the basic heating coil or boiler in the furnace 23. Hot water flows from the furnace to pipe 66 leading to the room radiator 63 by reason of the basic circulating pump (not shown) commonly used in hot water heating systems. Thus, the return water is preheated before reaching the furnace. In practice, of course, a series of room radiators are used in the system.

The coils in each embodiment are filled with a fluid such as water on other heat transfer liquids and a standard supply reservoir and overflow system similar to that used in vehicle engine cooling systems (not shown) can be used to maintain the supply of fluid in the coils.

What is claimed as new is:

1. A heat saving system for recovering heat from a furnace chimney flue pipe which comprises:
    (a) a chamber in said flue pipe through which the flue gases pass,
    (b) a first heat exchange coil in said chamber interposed in the path of flue gas,
    (c) a cold fluid inlet leading to said furnace,
    (d) a fluid in said coil, and
    (e) means to connect said coil to said cold fluid inlet to transfer heat from said chimney flue pipe to the inlet fluid to be heated in said furnace, said chamber comprising a rectangular box of fireproof material having an opening at opposite ends to connect to a chimney flue pipe, and said coil being mounted in a rectangular frame extending diagonally from one corner of said box to a diagonally opposite corner in a plane angled to the path between said openings.

2. A heat saving system for recovering heat from a furnace chimney flue pipe which comprises:
    (a) a chamber in said flue pipe through which the flue gases pass,
    (b) a first heat exchange coil in said chamber interposed in the path of flue gas,
    (c) a cold fluid inlet leading to said furnace,
    (d) a fluid in said coil, and
    (e) means to connect said coil to said cold fluid inlet to transfer heat from said chimney flue pipe to the inlet fluid to be heated in said furnace, said chamber comprising a rectangular box of fireproof material having an inlet opening and an outlet opening at opposite ends to connect to a chimney flue pipe, said coil being mounted in a plane within a rectangular frame extending diagonally from a lowest point in said box at the inlet end nearest the heat source to a highest point in a diagonally opposite corner at the outlet end of the box, said plane being angled to the path of flue gases between said openings.

* * * * *